(12) United States Patent
Nader et al.

(10) Patent No.: US 8,681,736 B2
(45) Date of Patent: Mar. 25, 2014

(54) TIME-TO-TRIGGER HANDLING METHODS AND APPARATUS

(75) Inventors: Ali G. Nader, Malmö (SE); Tobias Junno, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1504 days.

(21) Appl. No.: 11/849,601

(22) Filed: Sep. 4, 2007

(65) Prior Publication Data

US 2009/0059871 A1    Mar. 5, 2009

(51) Int. Cl.
*H04W 4/00*    (2009.01)

(52) U.S. Cl.
USPC .............................. 370/331; 370/332; 455/436

(58) Field of Classification Search
None
See application file for complete search history.

(56) References Cited

U.S. PATENT DOCUMENTS

| | | | |
|---|---|---|---|
| 5,995,836 A * | 11/1999 | Wijk et al. | 455/436 |
| 6,181,943 B1 | 1/2001 | Kuo et al. | |
| 6,754,493 B1 * | 6/2004 | Jetzek | 455/436 |
| 7,082,301 B2 | 7/2006 | Jagadeesan et al. | |
| 8,195,219 B2 * | 6/2012 | Iwamura et al. | 455/525 |
| 2002/0049058 A1 * | 4/2002 | Tee | 455/437 |
| 2002/0160781 A1 * | 10/2002 | Bark et al. | 455/450 |
| 2003/0218995 A1 | 11/2003 | Kim et al. | |
| 2005/0014501 A1 | 1/2005 | Aitkenhead et al. | |
| 2005/0096053 A1 | 5/2005 | Liu et al. | |
| 2006/0160539 A1 | 7/2006 | Juan et al. | |
| 2006/0258386 A1 | 11/2006 | Jeong et al. | |
| 2007/0129017 A1 * | 6/2007 | Dalsgaard et al. | 455/67.11 |
| 2011/0026492 A1 * | 2/2011 | Frenger et al. | 370/331 |
| 2011/0059741 A1 * | 3/2011 | Klein | 455/436 |

FOREIGN PATENT DOCUMENTS

| | | | | |
|---|---|---|---|---|
| GB | 002287858 A | * | 9/1995 | H04Q 7/38 |
| WO | 9726770 A2 | | 7/1997 | |
| WO | 01076304 A1 | | 10/2001 | |
| WO | 2008112126 A2 | | 9/2008 | |

OTHER PUBLICATIONS

3GPP Technical Specification TS 25.331, V5.19.0, Radio Resource Control (RRC) Protocol Specification (Release 5), Dec. 2006; Sections 8.3.4, 10.3.7.39, 14 and 14.11.
3GPP Technical Specification TS 25.304, V5.9.0, UE Procedures in Idle Mode and Procedures for Cell Reselection in Connected Mode (Release 5), Sep. 2005; Section 5.2.6.1.
Int'l Search Report and Written Opinion dated Jan. 15, 2009 for PCT/EP2008/061307.

* cited by examiner

*Primary Examiner* — Hassan Phillips
*Assistant Examiner* — Mark A Mais
(74) *Attorney, Agent, or Firm* — Potomac Patent Group PLLC

(57) ABSTRACT

Time-to-trigger (TtT) time periods are usually fixed. A better TtT parameter is adapted based on the signal quality that a receiver perceives from its surrounding area. For example, the lower the value of a first signal quality at the same time that the value of a second signal quality is greater than a trigger threshold, the shorter the TtT parameter becomes.

13 Claims, 4 Drawing Sheets

TIME-TO-TRIGGER HANDLING METHODS AND APPARATUS

BACKGROUND

This invention relates to electronic communication systems, and in particular to wireless multiple-access communication systems.

Many technological systems have more than one operational state, with transitions between operational states triggered by changes in one or more parameters or conditions. In order to avoid a "trigger-happy" system, a so-called time-to-trigger (TtT) parameter is often provided to delay a state transition after a parameter change. For example, the TtT parameter can see to it that a state change does not occur unless the system has been in a steady state for at least a period of time, i.e., the time to trigger. The hysteresis introduced into the operation of the system by the TtT parameter helps prevent the system from "ping-ponging" between states.

Such TtT parameters are used by user equipments (UEs), such as mobile telephones and other remote terminals, in various wireless communication systems, including cellular radio telephone systems like the universal mobile telecommunications system (UMTS). The UMTS is a third generation (3G) mobile communication system being developed by the European Telecommunications Standards Institute (ETSI) within the International Telecommunication Union's (ITU's) IMT-2000 framework. The UMTS employs wideband code division multiple access (WCDMA) for the air interfaces between UEs and base stations (BSs) in the system. The Third Generation Partnership Project (3GPP) promulgates specifications for the UMTS and WCDMA systems. This application focuses on WCDMA communication systems simply for economy of explanation, and the artisan will understand that the principles described in this application can be implemented in other communication systems.

FIG. 1 depicts a mobile radio cellular telecommunication system 10, which may be, for example, a WCDMA communication system. Radio network controllers (RNCs) 12, 14 control various radio network functions, including for example radio access bearer setup, diversity handover, etc. More generally, each RNC directs UE calls via the appropriate BSs, which communicate with each UE through downlink (DL) and uplink (UL) channels. RNC 12 is shown coupled to BSs 16, 18, 20, and RNC 14 is shown coupled to BSs 22, 24, 26. Each BS, which is a Node B in 3GPP parlance, serves a geographical area that can be divided into one or more cell(s). BS 26 is shown as having five antenna sectors S1-S5, which can be said to make up the cell of the BS 26. The BSs are coupled to their corresponding RNCs by dedicated telephone lines, optical fiber links, microwave links, etc. Both RNCs 12, 14 are connected with external networks, such as the public switched telephone network (PSTN), the Internet, etc., through one or more core network nodes, such as a mobile switching center (not shown) and/or a packet radio service node (not shown).

As a UE moves with respect to the BSs, and possibly vice versa, an on-going connection is maintained through a process of hand-off, or handover, of the connection from one BS to another BS. Early cellular systems used hard handovers (HHOs), in which a first BS (covering the cell that the UE was leaving) would stop communicating with the UE just as a second BS (covering the cell that the UE was entering) started communication. Modern cellular systems, including UMTS systems, typically use diversity, or soft, handovers (SHOs), in which a UE is connected simultaneously to two or more BSs. The multiple radio links operating simultaneously are sometimes called the "active set". In FIG. 1, UEs 28, 30 are shown communicating with plural BSs in diversity handover situations. UE 28 communicates with BSs 16, 18, 20, and UE 30 communicates with BSs 20, 22. A control communication link between the RNCs 12, 14 permits diversity communications to/from the UE 30 via the BSs 20, 22. According to the current standards, a UE may be simultaneously connected to up to six BSs in SHO, which is to say that the UE may have as many as six cells in its active set.

The network (NW), e.g., the RNCs and BSs, grants and sets up the SHO and generally controls the cells in a UE's active set based on cell-quality reports sent to the NW by the UE. A cell-quality report can be based on UE-measurements of the average signal-to-interference ratio (SIR) of control channels, such as common pilot channels (CPICHs), of all cells in the UE's active set and other cells that the UE receives. The UE measures the SIRs on a regular basis (typically five times per second). It will be understood that cell-quality reports can also be based on measurements of other parameters, e.g., received signal code power (RSCP).

When the UE determines that a new cell has a SIR that is better than the SIR of a cell in the active set, an Active Set Update—ADD procedure is initiated that is described, for example, at Sections 8.3.4 and 14.11 of 3GPP TS 25.331 V 5.19.0, Radio Resource Control (RRC) Protocol Specification (Release 5) (December 2006). The UE reports Event 1a (Radio Link Addition) to the NW, and an RNC informs the new BS to start uplink (UL) synchronization. After an acknowledgement message from the new BS is received in the RNC, an "Active Set Update—ADD" message is transmitted to the UE, and the new BS starts to transmit on the DL to the UE.

To avoid a prematurely adding the new cell to the active set, the UE does not report Event 1a unless the new cell has had a better SIR, i.e., the new cell has fulfilled the necessary triggering condition, for at least a certain period of time, which is to say that the new cell has been better for at least a TtT period of time. The TtT is typically a parameter that the UE receives from the NW. In general, the UE starts a timer when a new cell's measured quality fulfils the requirements described in TS 25.331 cited above and stops the timer when that cell's measured quality drops below the aforementioned requirements.

This operation of the UE is depicted in FIG. 2, which is a plot of measured cell quality on the vertical axis against time on the horizontal axis. The measured quality of a first cell in the active set is indicated by the solid line, and the measured quality of a second cell not in the active set but monitored by the UE is indicated by the dashed line. The UE sets and resets its TtT timer as the cell qualities vary with respect to each other. As indicated by the vertical line, the UE starts its timer when the measured quality of the second cell exceeds the measured quality of the first cell, and as indicated by the vertical arrow, the UE reports Event 1a to the NW when the time period measured by the timer has elapsed, which is to say when the measured quality of the second cell has exceeded the measured quality of the first cell for the TtT period.

It will be appreciated that there are many other applications of a time-to-trigger parameter in communication and other systems. For example, a TtT parameter is used in a similar manner for other measurement events reported in WCDMA communication systems as described in 3GPP TS 25.331. It will also be appreciated that the name of the parameter need not always be "time-to-trigger". For example, Section 5.2.6.1 of 3GPP TS 25.304, UE Procedures in Idle Mode and Procedures for Cell Reselection in Connected Mode (Release 5)

(September 2005) describes parameters called Treselection and Penalty_Time, which are used as TtT parameters.

U.S. Pat. No. 7,082,301 to Jagadeesan et al. describes a method for handing off a call between networks that includes handing off the call when the quality of a first link is less than a handoff trigger threshold for a "drop count" duration and when the quality of a second link is greater than a minimum quality threshold. As described in column 9, for example, the handoff trigger thresholds are used to prevent ping-ponging.

U.S. Patent Application Publication No. US 2006/0258386 by Jeong et al. describes a ping-pong duration threshold and a ping-pong occurrence number threshold, and a UE that uses a non-scaled down cell reselection time limit in a non-high-speed UE state, and a scaled-down cell reselection limit in a high-speed UE state.

Although steady-state guard times like a TtT period can avoid ping-pong effects and trigger-happy systems, such fixed guard times can cause problems. For example, when it comes to tuning the value of such a guard time, there is always a trade-off between system stability and system response lag. The longer the guard time is, the more stable the system is (state changes are less frequent), but also the slower the system responds to a stimulus. Conversely, the shorter the guard time is, the faster the system responds to a stimulus, but also the more prone the system becomes to ping-ponging (state changes are more frequent).

In the example of a UE's reporting Event 1a, a too-long TtT period slows down the handover process, but a too-short TtT leads to quality-measurement reports flooding the NW. A NW operator usually tries to tune the TtT parameter to avoid both of those negative behaviors, but it is impossible to find a value that adequately covers all possible cases.

For example, consider a UE that is located on the border of a cell and is moving out of the cell when the UE tries to set up a call or request a service. If the UE succeeds in setting up a connection to the cell, the UE may experience a bad connection/reception because the UE is moving out of the cell. As the connection/reception worsens, the UE might find a much better quality neighboring cell, but the UE is not allowed to trigger an event to inform the NW about the new cell unless the TtT period has elapsed. Eventually the UE can lose its connection to the NW despite the fact that good cells exist in its vicinity. As a result of the loss of a call/service in such scenarios, the UE vendor and the NW operator lose goodwill.

In addition, problems with TtT periods have from time to time led to problems with acceptance tests of equipment by operators. Problems arising out of TtT periods can also be seen in urban areas where cells suddenly appear and disappear as a result of complex cell planning.

SUMMARY

In accordance with aspects of this invention, there is provided a method in a communication system of adapting a time period based on signal measurements. The method includes obtaining a first measurement of a signal quality; comparing the first measurement to a trigger threshold; if the first measurement passes the trigger threshold, initiating measurement of a time period; and adapting a length of the time period based on the first measurement of the signal quality.

In accordance with other aspects of this invention, there is provided an apparatus in a receiver for adapting a time period based on received signal measurements. The apparatus includes a processor for obtaining a first measurement of a signal quality; for comparing the first measurement to a trigger threshold; if the first measurement passes the trigger threshold, for initiating measurement of a time period; and for adapting a length of the time period based on the first measurement of the signal quality.

In accordance with other aspects of this invention, there is provided a computer-readable medium encoded with a computer program for adapting a time period based on signal measurements by a receiver. The computer program when executed causes the computer to perform at least the steps of obtaining a first measurement of a signal quality; comparing the first measurement to a trigger threshold; if the first measurement passes the trigger threshold, initiating measurement of a time period; and adapting a length of the time period based on the first measurement of the signal quality.

BRIEF DESCRIPTION OF THE DRAWINGS

The various objects, features, and advantages of this invention will be understood by reading this description in conjunction with the drawings, in which.

DETAILED DESCRIPTION

The inventors have recognized that the problem with TtT periods in systems such as those described in TS 25.304 and TS 25.331 is that the TtT period is fixed. A better TtT parameter is adapted based on the quality that the UE perceives from its surrounding area. As a particular example, the more desperate the UE's situation becomes in its current cell at the same time that a neighboring cell(s) looks more attractive, the shorter the TtT parameter should become. It will be understood that "desperation" and "attractiveness" can be quantified in this context in several ways, e.g., by measurements of SIR, RSCP, block error rate (BER), etc. It will also be understood that the examples described in this application are only exemplary and not to be construed as limiting the inventions defined by the claims.

Figure 3:
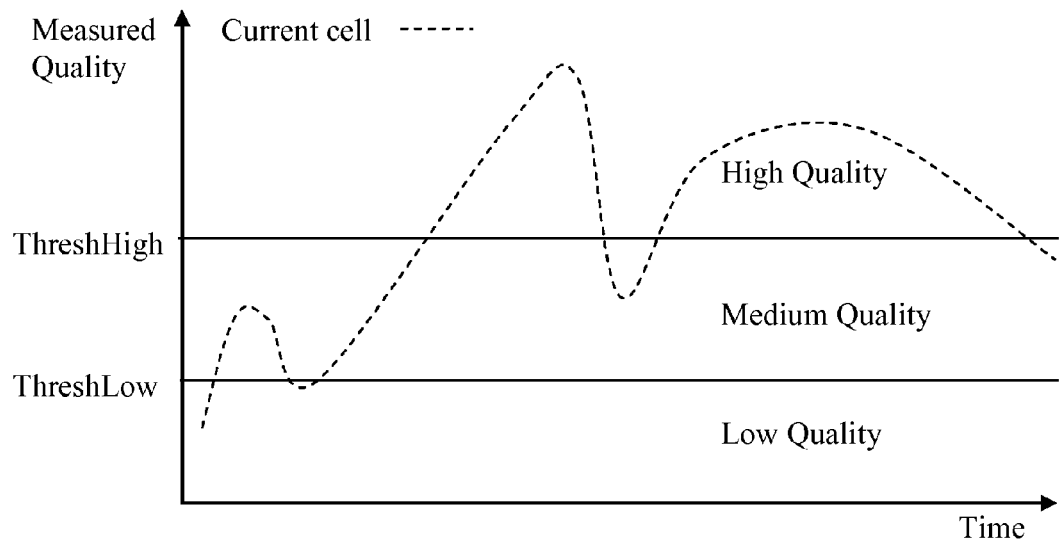
FIG. 3 is a plot of another example of measured signal quality against time in a communication system.

In accordance with this invention, one or more quality thresholds are set in the UE. For the sake of simplicity, assume that two thresholds are set in the UE as illustrated by FIG. 3, which is a plot of hypothetical measured signal quality against time in a communication system. A first threshold (ThreshHigh in FIG. 3) sets a floor for high quality, which is to say that when a signal quality measurement is greater than ThreshHigh, the UE assumes high quality in its surrounding environment. A second threshold (ThreshLow in FIG. 3) sets a ceiling for low quality, which is to say that when a signal quality measurement is less than ThreshLow, the UE assumes low quality in its surrounding environment. If the signal quality measurement is between the first and second thresholds, medium quality is assumed.

For a real-world example of the inventors' adaptive TtT parameter, assume a UE has been configured with Treselection (broadcast) and TtT (broadcast or dedicated configuration) parameters by the NW. The Treselection parameter described in 3GPP TS 25.304 is used in the process of cell reselection, in which the UE chooses a new serving cell but not before the new cell has been better according to criteria specified in 3GPP TS 25.304 during Treselection. The TtT parameter is used in event evaluation described in Section 10.3.7.39 of 3GPP TS 25.331 (e.g., Event 1a). Once the requirements for triggering an event are fulfilled, a measurement report is sent to the NW but not before the requirements have been fulfilled for the TtT period.

Now, the TtT parameter (and/or the Treselection parameter) is adapted to the quality the UE perceives from the surroundings by scaling. More specifically, as long as the UE perceives high quality from the cell(s) that it is currently camped on (i.e., as long as the UE's measurement(s) of signal quality from current cell(s) exceed ThreshHigh), the TtT value configured by the NW is obeyed, but when the perceived quality from a current cell drops below ThreshHigh, the UE scales the TtT parameter by one or more quality scaling factors (QSF).

Figure 2:
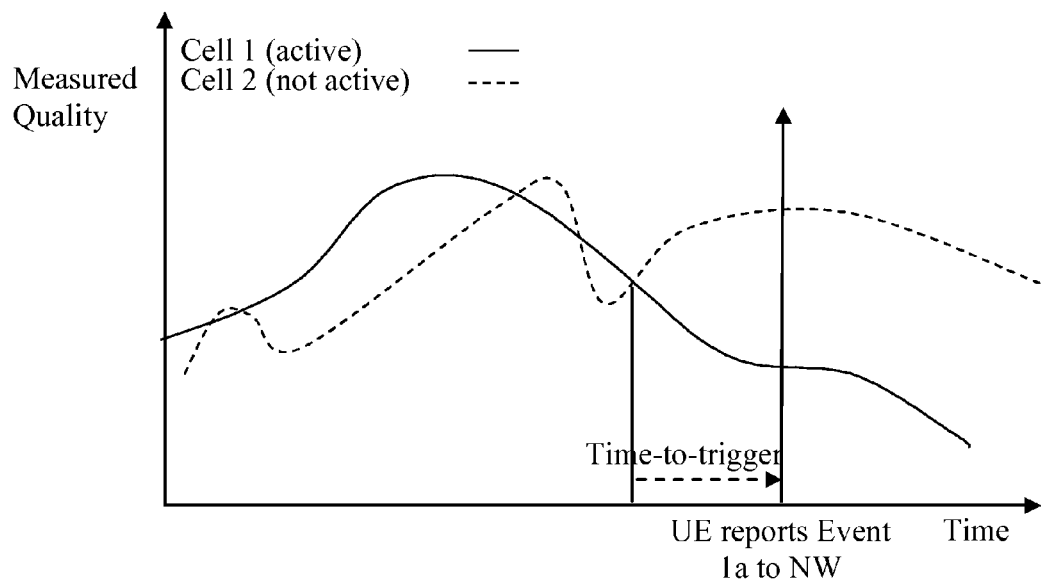
FIG. 2 is a plot of an example of measured signal quality against time in a communication system.

It will be appreciated that even when there is more than one currently active cell, e.g., during soft handover, there is typically only one set of threshold values for all current cells. It can be seen from Section 14 of 3GPP TS 25.331 that in soft handover the quality of a new cell that is being evaluated for addition (Event 1a), deletion (Event 1b), or any other event is compared to a quality level that is a function of all cells in the active set. In such a case, FIG. 2 would look the same, with the solid line representing the quality level determined from the function of all cells in the active set and the dashed line representing the new cell being compared to the solid line. Thus, the TtT value is scaled in the same way for all cells in an active set, with the active set being treated as if it were one cell having a quality that is a function of all cells in the active set.

In the example depicted in FIG. 3, the UE scales the TtT parameter by one of three scaling parameters according to the two thresholds. In particular, the TtT parameter set by the network is scaled by a unity QSF while the signal quality is greater than ThreshHigh, by a smaller QSF while the signal quality is between ThreshHigh and ThreshLow, and by a still smaller QSF while the signal quality of the current cell(s) is less than ThreshLow. It will be noted that it is preferable to filter, or smooth, the quality measurements before comparing them to the thresholds.

The value of the QSF is thus related to the measured signal quality by a mathematical function, and the adapted TtT value is just the product of the QSF and a nominal TtT. This can be expressed as follows:

$$\text{Adapted TtT} = \text{QSF}(\text{Quality}) \times \text{TtT} \qquad \text{Eq. 1}$$

in which QSF(Quality) indicates the functional dependence of the QSF value on signal quality. In the example depicted in FIG. 3, the QSF can have predefined fixed values for respective quality levels, such as QSF=⅓ for low quality, QSF=½ for medium quality, and QSF=1 for high quality. The QSF function, e.g., those three QSF values, can be preprogrammed into the UE or suitably communicated to the UE.

In another aspect of this invention, scaling can be performed more dynamically for each quality level. For example, the more the UE's current condition differs from a threshold condition, the more the TtT parameter is scaled down, i.e., the smaller the QSF. This operation can be expressed as follows:

$$\text{Adapted TtT} = \text{QSF}(\text{Quality}) \times (1 - \text{TCP}) \times \text{TtT} \qquad \text{Eq. 2}$$

in which TCP is a threshold condition penetration level, which may be normalized to values between zero and one. In other words, the more the threshold condition (e.g., a cell-reselection criterion or event-reporting criterion) is fulfilled, the more it can be assumed that the condition will finally be fulfilled and hence less time needs to be spent waiting for achievement of steady-state before triggering.

In the preceding equation, TCP=0 means that the threshold condition is just fulfilled (e.g., the signal quality is just equal to the trigger threshold that starts the nominal TtT), and TCP=1 means that the signal quality is far greater than the threshold (the highest possible penetration level), e.g., the highest possible quality measured level. It will be understood that there are many ways to normalize TCP depending on the value range of the input data. Normalization is a technique that is well-known in the art, and any suitable technique may be used.

It will be appreciated that TCP is not directly related to a current cell's ThreshHigh, ThreshLow, and QSF as depicted in FIG. 3, which is to say that high TCP does not necessarily imply high received signal quality of a current cell. For example, in a case such as Event 1f described in Section 10.3.7.39 of 3GPP TS 25.331, the UE sends a report to the NW when a cell (i.e., a primary CPICH) becomes worse than a threshold, and thus the applicable criterion is becoming worse than a threshold. If a cell's quality is very low, then it fulfills the applicable criterion by far, and so TCP=1 and the UE has no need to wait TtT before sending its report.

As an example of the more dynamic adaptive parameter described above in connection with Eq. 2, assume that a UE is camped on a cell in idle mode, that the UE measures a much higher signal quality from a neighboring cell, and that the camped-on cell's signal quality is just enough, e.g., the camped-on cell's signal quality is equal to a trigger criterion specified in 3GPP TS 25.304. The UE is typically not allowed to select the neighboring, better cell until the TtT period has elapsed. In this example, assume that the signal quality of the new cell continues to be better than the current cell during the TtT period. These exemplary conditions can be quantified by the following values:

current cell's measured quality: 10
minimum measured quality to trigger (MIN): 10
neighboring cell's measured quality: 12
maximum possible measured quality (MAX): 15
TtT: 5 seconds
QSF(MIN)=1

In this example, the dynamic adaptation of the QSF can be advantageously implemented as follows:

$$\text{TCP} = (12 - \text{MIN})/(\text{MAX} - \text{MIN}) = (12 - 10)/(15 - 10) = 0.4$$

which means that the neighboring cell's measured quality not only fulfills the condition for being selected (i.e., signal quality≥10), but also penetrates the condition by 40%. Hence from Eq. 2:

$$\text{Adapted TtT} = 1 \times (1 - 0.4) \times 5 \text{ sec} = 3 \text{ sec}$$

which means that if the above condition continues for 3 seconds, the UE performs a cell reselection instead of waiting 5 seconds before performing a cell reselection.

It will be understood that a new Adapted TtT is computed each time new measured values are available, and thus several values of the Adapted TtT are typically computed before a started timer expires. It is preferred that the timer is updated with the latest computed value. Thus, if the measured quality of the neighboring cell in this example jumped to 15 at the next measurement, causing the next computed Adapted TtT=0, then cell reselection is triggered immediately instead of being triggered after 3 seconds. Similarly, if the neighboring cell's measured quality dropped to 10 at the next measurement instead of increasing to 15, then the UE would wait 5 seconds for cell reselection. The timer, however, is not restarted, and thus, if the next measurement occurred 1 second after the measurement that resulted in a TtT of 3 seconds and started the timer as in the example, the UE would wait only 4 more seconds for the timer to expire. It will be understood that as the TtT period changes for each computation (which might be carried out various numbers of times per second), it may be advantageous to filter or average the period.

Figure 4:
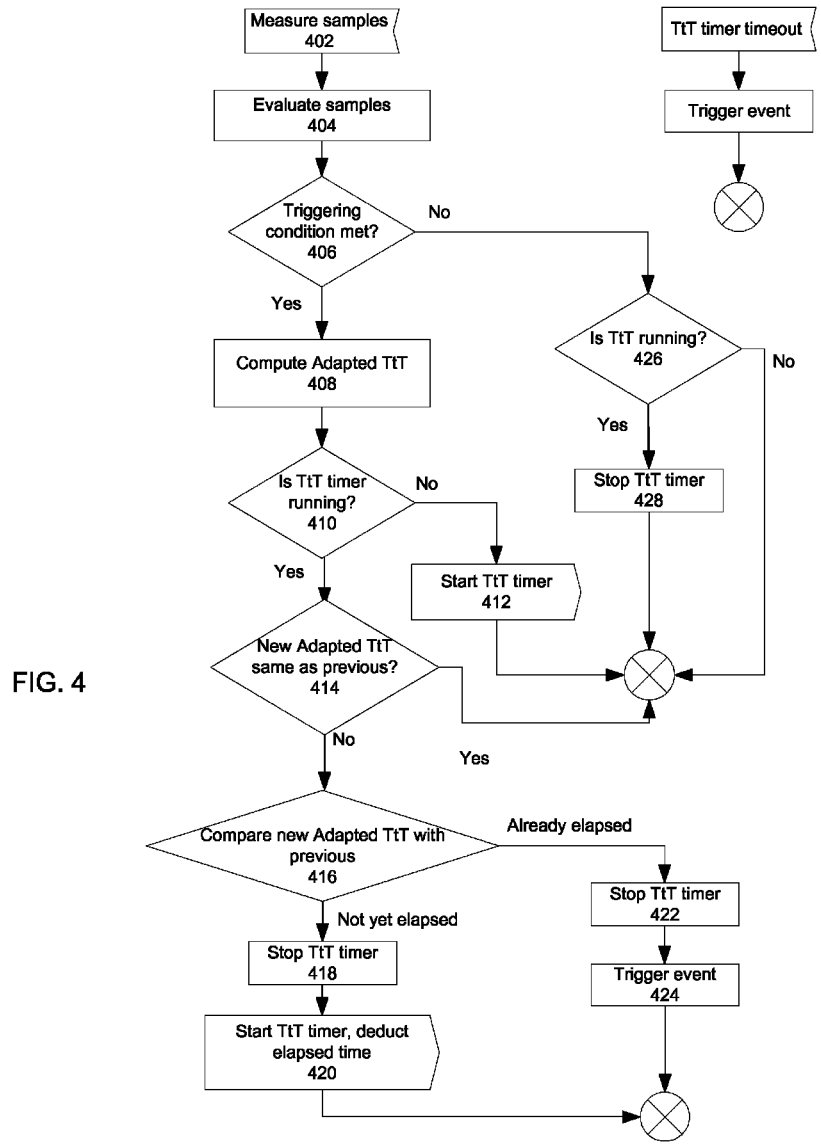
FIG. 4 is a flow chart of a method of adapting a time-to-trigger parameter.

The flow chart of FIG. 4 describes a method of adapting a time parameter that is in accordance with this invention. In step 402, measurements, such as signal quality measurements are collected, and in step 404, the collected measurements are evaluated by comparing them to a trigger threshold. If the trigger threshold is satisfied, e.g., the signal quality exceeds the threshold (Yes in step 406), an adapted TtT value is computed (step 408).

In step 410, it is determined whether a TtT timer is already running. If not (No in step 410), the timer is started in step 412 and UE processing continues; if so (Yes in step 410), the UE determines whether the just-computed TtT value is the same as the TtT value previously computed (step 414). If so (Yes in step 414), the UE processing continues; if not (No in step 414), the UE compares the just-computed TtT value and the previous TtT value (step 416).

If the previously computed TtT time period has not yet elapsed by step 416, the timer is stopped (step 418) and restarted with the just-computed TtT value after deducting any time period that may have already elapsed on the timer (step 420), and the UE processing continues. If the previously computed TtT time period has elapsed by step 416, the timer is stopped (step 422) and the corresponding event is triggered (step 424), after which the UE processing continues. As an example of the effect of these steps, assume that the timer is running and that the previously computed TtT value is 20 seconds and has not yet elapsed. If the just-computed TtT value is 10 seconds and that value was computed 1 second after the previously computed TtT value, the UE will wait 9 more seconds before the timer expires and the event is triggered (ignoring the effect of any subsequently computed TtT values).

If the trigger threshold is not satisfied (No in step 406), the UE determines whether the TtT timer is running (step 426). If the timer is running (Yes in step 426), the timer is stopped and the method continues. If the timer is not running (No in step 426), the UE processing simply continues.

Many instances of failed call-setup depend on the problems illustrated by the examples described above. By implementing this invention, better UE behavior is obtained not only in the examples mentioned above, but in all cases (both connected and idle modes), especially in poorly tuned NWs. As a result, users can experience much fewer loss-of-service scenarios.

Figure 5:
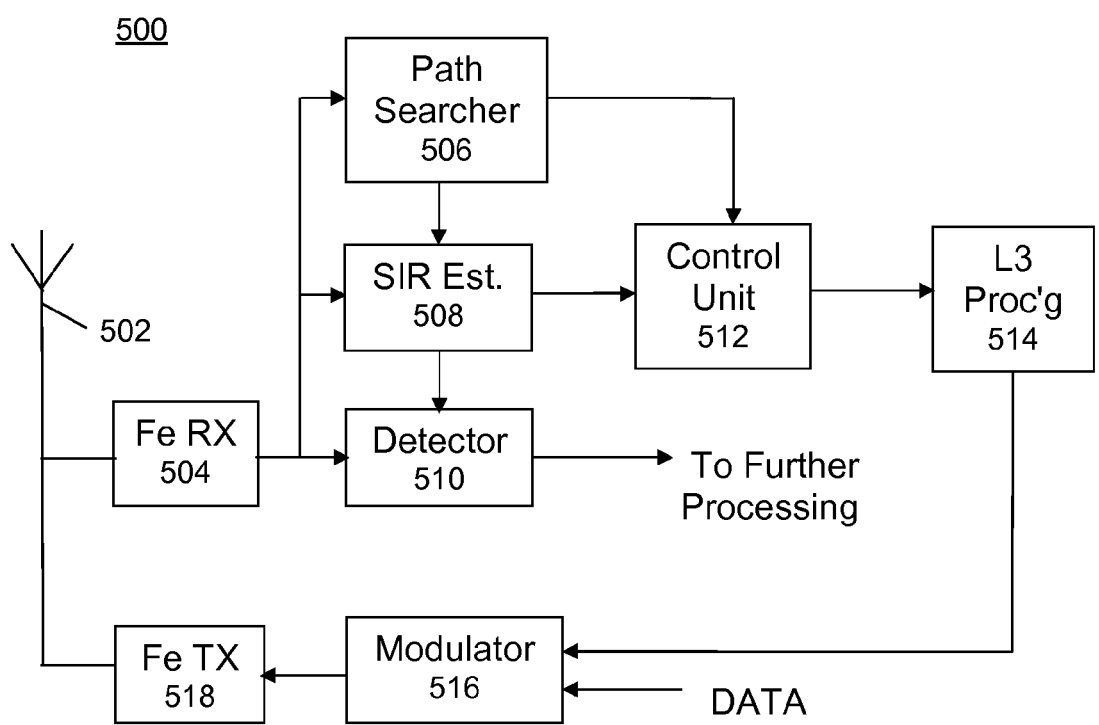
FIG. 5 is a block diagram of a user equipment in a communication system.

FIG. 5 is a block diagram of a portion of a UE 500 that is suitable for implementing the adaptive TtT parameter as described above. For simplicity, only some parts of the UE 500 are shown in the figure.

Signals transmitted by BSs are received through an antenna 502 and down-converted to base-band signals by a front-end receiver (Fe RX) 504. On a regular basis for all detected cells, the RSCP is estimated and the received signal strength indicator (RSSI) is computed by a path searcher 506. An RSCP can be estimated by, for example, de-spreading the base-band signal from a detected cell with the scrambling code (and CPICH channelization code) corresponding to the cell.

Methods of computing RSSIs are well known in the art. In suitable communication systems, for example, the RSSI can be estimated by computing the variance of the received signal over a given time period, such as one time slot (e.g., 0.67 milliseconds). The PDP can be estimated by, for example, correlating the received signal with the scrambling code (for the transmitting cell) and the CPICH channelization code for different time lags, where the longest time lag has a length corresponding to a worst-case assumption of the delay spread, e.g., 100 or so chips of the scrambling code. Then, signal peaks in the PDP can be determined as those peaks in the correlation result that have powers greater than a threshold, e.g., 5% of the highest signal peak's power, and the rest of the correlation result can then be assumed to indicate no signal.

Information from the path searcher 506 is provided to a SIR estimator 508 that estimates the signal level S and interference level I for all fingers, or paths, for all detected cells. In some systems, this may not be done for all detected cells but only for those detected cells that are included in the active set. The SIR estimates generated by the estimator 508 are provided to a detector 510, which uses the estimates in combining versions of the transmitted data and control symbols received along different paths and generating decoded symbols that are provided to further processing blocks in the UE 500. The SIR estimates are also provided to a control unit 512, such as a suitably programmed electronic processor, collection of logic gates, etc., and the control unit 512 uses the estimates in generating adapted TtT values as described above. The estimates are also used by the control unit 512 to trigger Event 1a and other reports, which can be produced by a Layer 3 (L3) processing component 514.

As described above, in a communication system such as a WCDMA system according to the 3GPP specification, the UE measures the average SIR of the CPICHs it receives on a regular basis. The UE's determination of an average SIR of the DL from a different cell that is larger than the SIR measured for a connected cell in the active set triggers an Event 1a (radio link addition) and transmission of a Layer-3 radio resource control (RRC) message on the UL dedicated physical data channel (DPDCH). Such an L3 RRC Event-1a message is provided to a modulator 516, which also receives other data to be transmitted by the UE 500. The change signal and data are appropriately transformed into a modulation signal, which is provided to a front-end transmitter (Fe TX) 518 that up-converts or otherwise transforms the modulation signal for transmission to the base station(s) through the antenna 502. In a 3GPP-compliant system, the RNC receives the Event-1a message and transmits an "add radio link" message to the UE as an L3 RRC message on the DL DPDCH.

Figure 1:
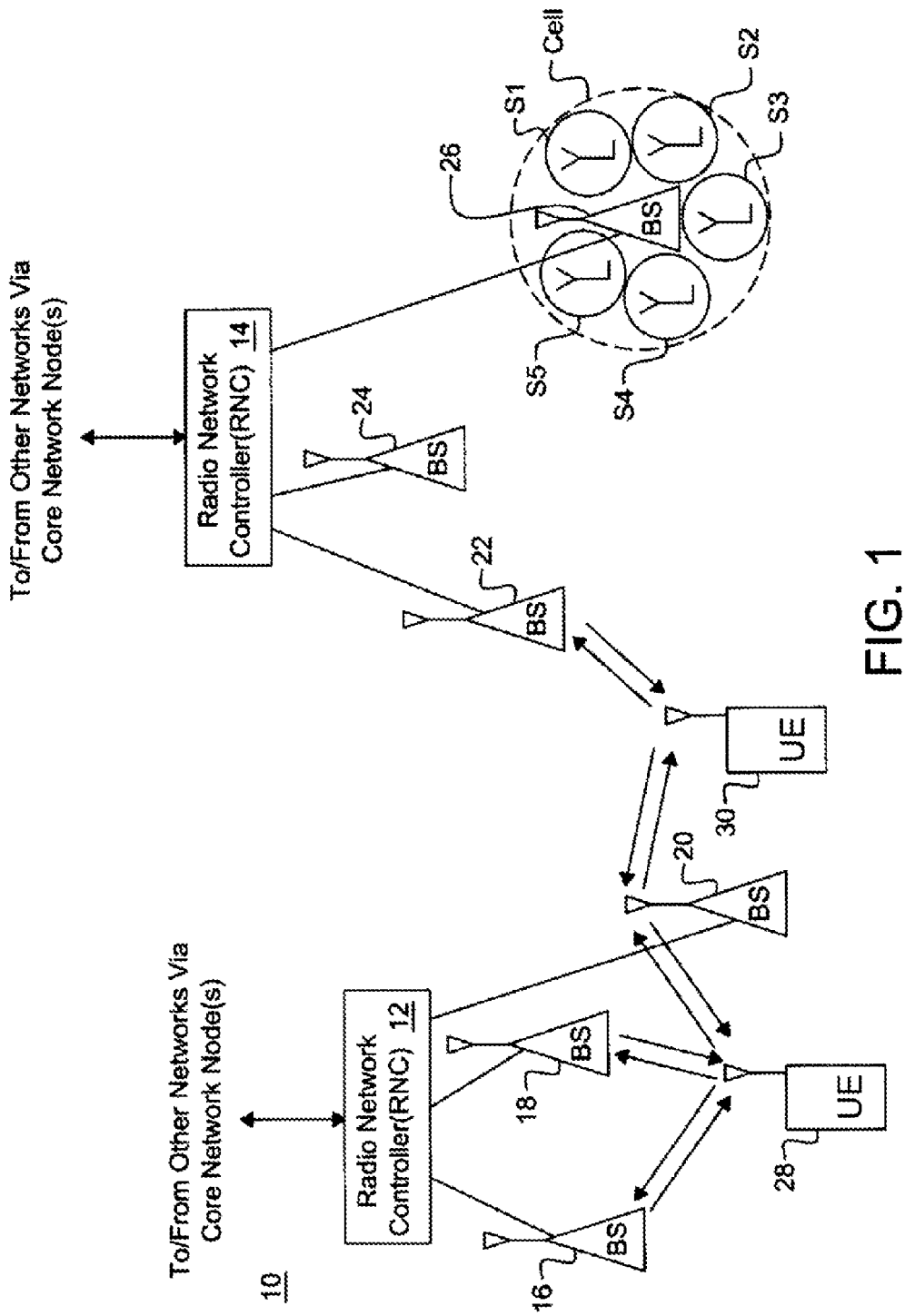
FIG. 1 is a block diagram of a communication system.

It will be understood that the UE can be implemented by other arrangements and combinations of the functional blocks shown in FIG. 5. In addition, it will be understood that the UE may simply report its measurements to another entity, such as a base station or radio network controller, depicted in FIG. 1, in the communication system rather than generating adapted TtT values itself. A suitable processor in that entity can then determine the adapted TtT values and send them to the UE. Nevertheless, it currently appears more advantageous to carry out these steps in the UE as doing so can avoid changes in the system specifications and increased control messaging.

It is expected that this invention can be implemented in a wide variety of environments, including for example mobile communication devices. It will be appreciated that procedures described above are carried out repetitively as necessary. To facilitate understanding, many aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Many communication devices can easily carry out the computations and determinations described here with their programmable processors and application-specific integrated circuits.

Moreover, the invention described here can additionally be considered to be embodied entirely within any form of non-transitory computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "non-transitory computer-readable medium" can be any means that can contain, store, communicate, propagate, or transport the program for use by or in connection with the instruction-execution system, apparatus, or device. The non-transitory computer-readable medium can be, for example but not limited to, an electronic, magnetic, optical, electromagnetic, infrared, or semiconductor system, apparatus, device, or propagation medium. More specific examples (a non-exhaustive list) of the non-transitory computer-readable medium include an electrical connection having one or more wires, a portable computer diskette, a RAM, a ROM, an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method in a communication system of adapting a time period based on signal measurements, comprising:
obtaining a first measurement of a signal quality;
comparing the first measurement to a plurality of different trigger thresholds that respectively correspond to a plurality of quality scaling factors (QSFs);
if the first measurement passes a trigger threshold, initiating measurement of a time period; and
adapting a length of the time period based on the first measurement of the signal quality by at least scaling the time period according to one of the QSFs based on a comparison of the first measurement to the plurality of different trigger thresholds, wherein the time period is scaled according to:

$$\text{Adapted TtT}=\text{QSF(Quality)} \times \text{TtT} \qquad \text{Eq. 1}$$

in which Adapted TtT is a scaled length of the time period, QSF(Quality) indicates a functional dependence of the QSF on signal quality, and TtT is a length of the time period before scaling; and the QSF used for scaling corresponds to the trigger threshold passed by the first measurement;

wherein the length of the time period is adapted based on an amount that the first measurement passes a trigger threshold; and
wherein the length of the time period is adapted according to:

$$\text{Adapted TtT}=\text{QSF(Quality)} \times (1-\text{TCP}) \times \text{TtT} \qquad \text{Eq. 2}$$

in which TCP is a threshold condition penetration level.

2. The method of claim 1, wherein the TCP is normalized.

3. The method of claim 1, further comprising the step of obtaining at least one subsequent measurement of the signal quality, wherein the length of the time period is successively adapted based on an amount that the at least one subsequent measurement passes a trigger threshold.

4. The method of claim 3, wherein the length of the time period is adapted a plurality of times.

5. The method of claim 4, wherein adapting the length of the time period a plurality of times includes:
determining whether a current adapted length of the time period is the same as a previous adapted length of the time period;
if the current adapted length is not the same as the previous adapted length and if the previous adapted time period has not yet elapsed, deducting a time period that has already elapsed from the current adapted time period; and
if the current adapted length is not the same as the previous adapted length and if the previous adapted time period has elapsed, triggering an event corresponding to the time period.

6. The method of claim 1, wherein each of the plurality of QSFs is a multiplicative factor that is different from others of the plurality of QSFs.

7. An apparatus in a receiver for adapting a time period based on received signal measurements, comprising:
a processor for obtaining a first measurement of a signal quality; for comparing the first measurement to a plurality of different trigger thresholds that respectively correspond to a plurality of quality scaling factors (QSFs); if the first measurement passes a trigger threshold, for initiating measurement of a time period; and for adapting a length of the time period based on the first measurement of the signal quality by at least scaling the time period according to one of the QSFs based on a comparison of the first measurement to the plurality of different thresholds, wherein the time period is scaled according to:

$$\text{Adapted TtT}=\text{QSF(Quality)} \times \text{TtT}$$

in which Adapted TtT is a scaled length of the time period, QSF(Quality) indicates a functional dependence of the QSF on signal quality, and TtT is a length of the time period before scaling; and the QSF used for scaling corresponds to the trigger threshold passed by the first measurement;

wherein the processor adapts the length of the time period based on an amount that the first measurement passes a trigger threshold; and
wherein the processor adapts the length of the time period according to:

$$\text{Adapted TtT}=\text{QSF(Quality)} \times (1-\text{TCP}) \times \text{TtT}$$

in which TCP is a threshold condition penetration level.

8. The apparatus of claim 7, wherein the first measurement is a measurement of signal to interference ratio, received signal code power, or block error rate.

9. The apparatus of claim 7, wherein the processor obtains at least one subsequent measurement of the signal quality, and successfully adapts the length of the time period based on an amount that the at least one subsequent measurement passes a trigger threshold.

10. The apparatus of claim 9, wherein the processor adapts the length of the time period a plurality of times.

11. The apparatus of claim 10, wherein the processor adapts the length of the time period a plurality of times by at least determining whether a current adapted length of the time period is the same as a previous adapted length of the time period; if the current adapted length is not the same as the previous adapted length and if the previous adapted time period has not yet elapsed, deducting a time period that has already elapsed from the current adapted time period; and if the current adapted length is not the same as the previous adapted length and if the previous adapted time period has elapsed, triggering an event corresponding to the time period.

12. A non-transitory computer-readable medium encoded with a computer program for adapting a time period based on signal measurements by a receiver, wherein the computer program when executed causes the computer to perform at least the steps of:
obtaining a first measurement of a signal quality;
comparing the first measurement to a plurality of different trigger thresholds that respectively correspond to a plurality of quality scaling factors (QSFs);
if the first measurement passes a trigger threshold, initiating measurement of a time period; and
adapting a length of the time period based on the first measurement of the signal quality by at least scaling the time period according to one of the QSFs based on a comparison of the first measurement to the plurality of different trigger thresholds, wherein the time period is scaled according to:

$$\text{Adapted TtT} = \text{QSF(Quality)} \times \text{TtT}$$

in which Adapted TtT is a scaled length of the time period, QSF(Quality) indicates a functional dependence of the QSF on signal quality, and TtT is a length of the time period before scaling; and the QSF used for scaling corresponds to the trigger threshold passed by the first measurement;
wherein the length of the time period is adapted based on an amount that the first measurement passes a trigger threshold; and
wherein the length of the time period is adapted according to:

$$\text{Adapted TtT} = \text{QSF(Quality)} \times (1 - \text{TCP}) \times \text{TtT}$$

in which TCP is a threshold condition penetration level.

13. The computer-readable medium of claim 12, wherein the computer program when executed causes the computer to perform at least the further step of obtaining a plurality of subsequent measurements of the signal quality; the length of the time period is successively adapted a plurality of times based on respective amounts that the subsequent measurements pass a trigger threshold; and adapting the length of the time period a plurality of times includes:
determining whether a current adapted length of the time period is the same as a previous adapted length of the time period;
if the current adapted length is not the same as the previous adapted length and if the previous adapted time period has not yet elapsed, deducting a time period that has already elapsed from the current adapted time period; and
if the current adapted length is not the same as the previous adapted length and if the previous adapted time period has elapsed, triggering an event corresponding to the time period.

* * * * *